United States Patent [19]
Chen

[11] Patent Number: 5,780,078
[45] Date of Patent: Jul. 14, 1998

[54] MATERIAL INJECTION SYSTEM OF A PLASTIC MATERIAL INJECTION MOLDING MACHINE

[75] Inventor: Fa-Shen Chen, Taichung, Taiwan

[73] Assignee: King Steel Machinery Co., Ltd., Taichung, Taiwan

[21] Appl. No.: 730,793

[22] Filed: Oct. 16, 1996

[51] Int. Cl.[6] .................................................. B29C 45/07
[52] U.S. Cl. ...................... 425/574; 264/328.11; 425/575
[58] Field of Search ............................ 425/574, 575; 264/328.11

[56] References Cited

U.S. PATENT DOCUMENTS

| | | | |
|---|---|---|---|
| 4,676,730 | 6/1987 | Yamasaki | 425/574 |
| 4,983,117 | 1/1991 | Von Buren et al. | 425/574 |
| 5,007,816 | 4/1991 | Hehl | 425/574 |

Primary Examiner—Tim Heitbrink
Attorney, Agent, or Firm—Morton J. Rosenberg; David I. Klein; Jun Y. Lee

[57] ABSTRACT

A material injection system of a plastic material injection molding machine is disclosed. It includes a base, several molds disposed on the base and a material injection seat X axis and Y axis movably disposed on the base. A material stopping member is disposed on each mold so as to prevent the foam material therein from spilling outside. Each mold is formed with a ventilating opening connected to a vacuum sucking machine for sucking out the air in the mold cavity during injection of the material, whereby the foam material can smoothly flow in the mold cavity without producing any bubble. The material injection nozzle is disposed with a material stopping structure for avoiding leakage of the material. An advancing and a retracting hydraulic cylinders are disposed on the base for eliminating the affection on the accuracy of alignment of the nozzle with the pouring gate. A guiding device is disposed between the material injection seat and the base for aligning the nozzle with the pouring gate of the mold during injection of the material without deflection. Thus, higher injection accuracy and quality can be achieved.

4 Claims, 9 Drawing Sheets

MATERIAL INJECTION SYSTEM OF A PLASTIC MATERIAL INJECTION MOLDING MACHINE

BACKGROUND OF THE INVENTION

The present invention relates to a material injection system of a plastic material injection molding machine.

Figure 1:
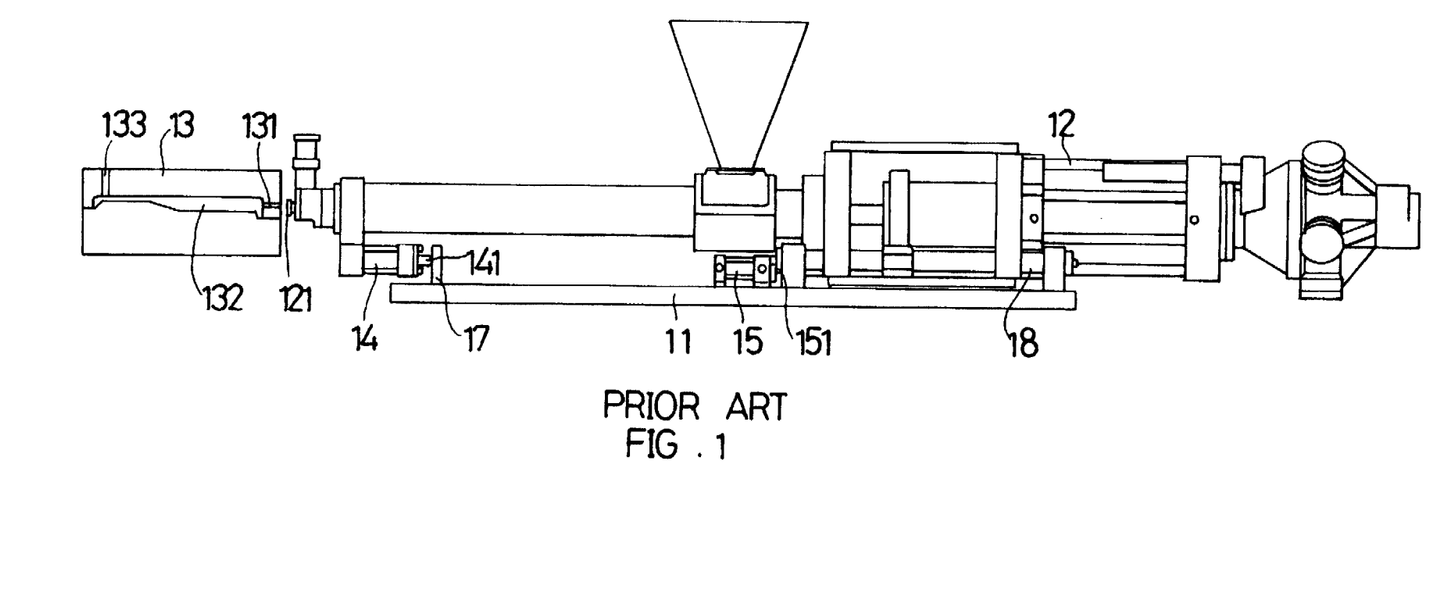
FIG. 1 is a side view of the material injection system of a conventional plastic material injection molding machine.

Please refer to FIG. 1. The material injection system of an existing plastic material injection molding machine includes a base 11, a material injection seat 12, a mold set 13, an advancing hydraulic cylinder 14 and a retracting hydraulic cylinder 15. The plastic material is molten into a liquid state. The piston stem 141 of the advancing hydraulic cylinder 14 pushes a pushing frame 17 of the base 11, making the material injection seat 12 thereon move in X axis direction. The material injection nozzle 121 is aligned with the pouring gate 131 of the mold set 13 to pour the plastic material into the mold cavity 132 thereof for molding. After the material is injected, a material stopping lever (not shown) longitudinally (in Z axis direction or perpendicularly) shuts off the material injection nozzle 121 to stop injecting the material. Then the retracting hydraulic cylinder 15 extends its piston stem 151 to push and restore the material injection seat 12 to its home position and complete a material injection operation.

After a long period of continuous operation, several shortcomings are found in such structure as follows:

1. Poor quality. During injection of the material, the material is quickly poured into the mold cavity. At this time, the air in the mold cavity is squeezed by the material to escape from the outlet 133 out of the mold set. However, when the material is poured into the mold cavity, the material is quickly foamed and expanded so that the air originally existing in the mold cavity can hardly totally escape from the outlet and will remain in the mold cavity. Therefore, the remaining air will be wrapped by the molded product to form bubbles on the surface thereof. As a result, the quality of the product can hardly be controlled and the ratio of defective products is increased.

2. Low production efficiency. The outlet has limited dimension so that the air in the mold cavity can only escape from the outlet by a limited speed. Therefore, the material injection speed of the material injection nozzle must cooperate with the escaping speed of the air. As a result, the material injection speed is limited and the production efficiency can be hardly increased.

3. The material will spill out. In the case that the plastic material is foamed at a quicker speed, the volume of the material will abruptly expand. Due to restriction of the fixed shape of the mold cavity, the material cannot freely flow at random. However, the pouring passage is communicated with the ambient air so that the foam material at this part is only subject to a stopping pressure from the atmosphere. Therefore, inevitably a part of the material will flow along the pouring passage to spill out of the mold. This will lead to change of pressure in the mold cavity so that the quality of the product can be hardly controlled.

4. The weight of the molded product is unstable. A part of the material will spill from the pouring passage so that the weight of the material remaining in the mold cavity cannot be accurately controlled. This makes it impossible to perform accurate injection molding operation.

5. The material is apt to leak from the material injection nozzle. The material injection nozzle is shut off at the middle section by a material stopping lever. When shutting off the material injection nozzle, simultaneously the material injection nozzle is entirely filled up with sticky plastic material. Therefore, after being shut off, a liquid material will still remain in the open end of the nozzle. Accordingly, after the mold set is removed, the remaining material will contact with the ambient air and chemically interact with the ambient air. Therefore, the remaining material may be oxidized or cooled and solidified. As a result, the material injection nozzle can be hardly tightly mated with the mold set.

6. The accuracy will be gradually decreased. The advancing hydraulic cylinder is disposed under the material injection nozzle and extends its piston stem to continuously collide the pushing frame 17 on the base. By means of the reaction force created by the collision, the material injection seat is driven to move forward in X axis direction so as to achieve the object of injection of the material. However, the material injection seat is directly disposed on the slide lever 18 on the base so that when the shock resulting from the continuous collision is transmitted to the slide lever, the cooperation between the material injection seat and the slide lever will be affected. This will lead to a clearance between the material injection seat and the slide lever and continuously increase the deflection of the movement of the material injection seat. Therefore, the accuracy is gradually decreased and the quality of the product will be greatly affected.

7. The location accuracy is excessively long and is subject to interference. The material injection seat can be moved transversely in Y axis direction on the base and continuously located at the pouring passage of the mold one by one. After the material injection seat is stopped, the advancing hydraulic cylinder pushes the material injection seat forward for injection of the material. Accordingly, a long ruler with scales (not shown) must be disposed on the base in cooperation with a detective controller (not shown) so as to accurately determine when the material injection seat should be stopped in front of the pouring passage of the mold. Therefore, the scales must be a series of numbers for the detective controller to identify. However, in the case that the power is suddenly cut off or the machine is suddenly stopped due to accident, the detective controller will deem the current scale as the original point. This will interfere with the material injection operation of the material injection seat.

SUMMARY OF THE INVENTION

To obviate the above problems, it is a primary object of the present invention to provide a material injection system of a plastic material injection molding machine, which is able to quickly suck out and remove the air in the mold cavity of the mold so as to avoid bubbles in the product and ensure the quality of the product.

It is a further object of the present invention to provide the above material injection system which is able to smoothen and quicken the material injection procedure and thus increase the production efficiency.

It is still a further object of the present invention to provide the above material injection system which is able to avoid spilling of the material and ensure that the material weight and pressure in the mold cavity are totally under control as expected without change resulting from the spilling of the material. Therefore, the injection molding operation can be performed in an accurate manner.

It is still a further object of the present invention to provide the above material injection system which when shutting off the flowing material, is able to simultaneously prevent the material from undesirably flowing and avoid leakage of the material.

It is still a further object of the present invention to provide the above material injection system which is able to ensure that the material injection seat is stably moved without affection resulting from collision so as to keep high quality of the product and reduce maintenance cost as well as prolong the using life of the material injection seat.

It is still a further object of the present invention to provide the above material injection system which is able to ensure that the material injection nozzle is coaxially mated with the pouring passage of the mold so as to stabilize the material injection operation.

According to the above objects, the material injection system of the present invention includes:

a base having a shifting seat and a pushing frame, the shifting seat being elevated above the top face of the base and transversely movable along Y axis slide rail, the pushing frame being disposed between the shifting seat and the molds;

a mold including a top mold block and a bottom mold block defining therebetween a mold cavity, a pouring passage and a ventilating passage, one end of each of the pouring passage and the ventilating passage passing through the mold to form a pouring gate and a ventilating opening; and a material injection seat disposed on the shifting seat and forward or backward movable along the X axis slide rail on the shifting seat, a front end of the material injection seat being disposed with a material injection nozzle opposite to the pouring gate, said material injection system being characterized in that:

the top mold block being disposed with a through hole passing through the pouring gate and the top face, the ventilating opening being connected to a vacuum sucking pipe;

a seat body disposed on the top mold block, a lower section of the lateral side of the seat body being formed with a notch facing the pouring gate, a top face of the notch being formed with a shaft hole passing through the top face of the seat body, the shaft hole being axially communicated with the through hole of the top mold block, a lever section being driven by a driving member disposed on the top face of the seat body to longitudinally move within the shaft hole, a bottom end of the lever section being connected with a material stopping pin by a connecting member, whereby the material stopping pin is movable in the through hole to open or close the pouring passage;

a material stopping member coaxially disposed in the material injection nozzle, a front end thereof having a slope face for stopping and closing the material injection nozzle, while a rear end thereof extends outside a rear side of the nozzle to connect with a driving member, whereby the material stopping member is movable in the nozzle;

an advancing hydraulic cylinder fixedly secured to the bottom face of the material injection seat near the material injection nozzle, a piston stem of the hydraulic cylinder extending outward to push the pushing frame so as to create a reaction force, making the material injection seat advance to make the material injection nozzle contact with the pouring gate of the mold; and a retracting hydraulic cylinder is fixedly secured at the front end of the shifting seat facing the mold, a piston stem of the hydraulic cylinder extending outward to push the material injection seat, making the material injection seat retract to make the material injection nozzle separate from the pouring gate of the mold.

The present invention can be best understood through the following description and accompanying drawing, wherein:

DETAILED DESCRIPTION OF THE PREFERRED EMBODIMENT

Figure 2:
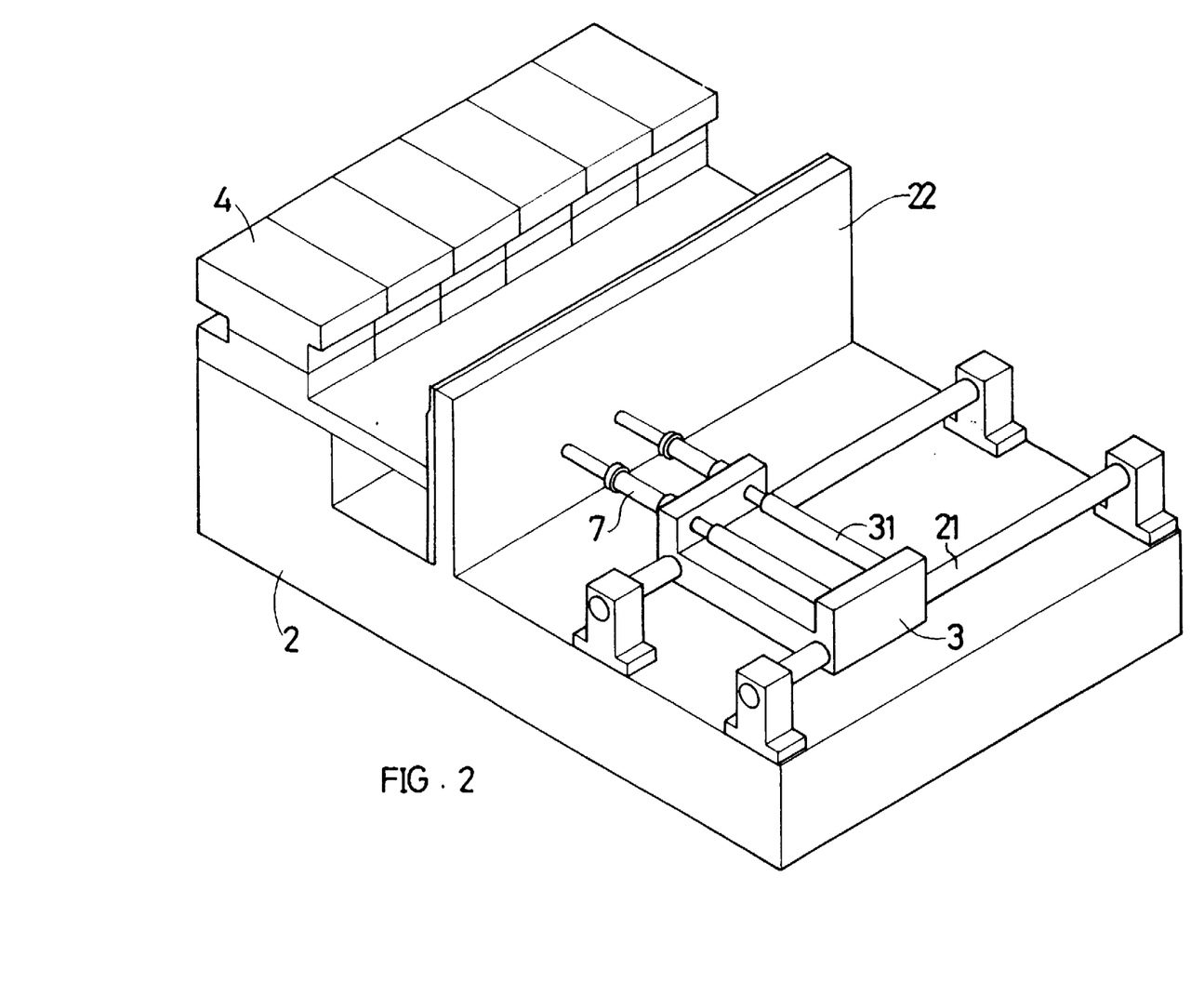
FIG. 2 is a perspective view of the material injection system of the present invention, exclusive of the material injection seat, advancing hydraulic cylinder and guiding device.
Figure 3:
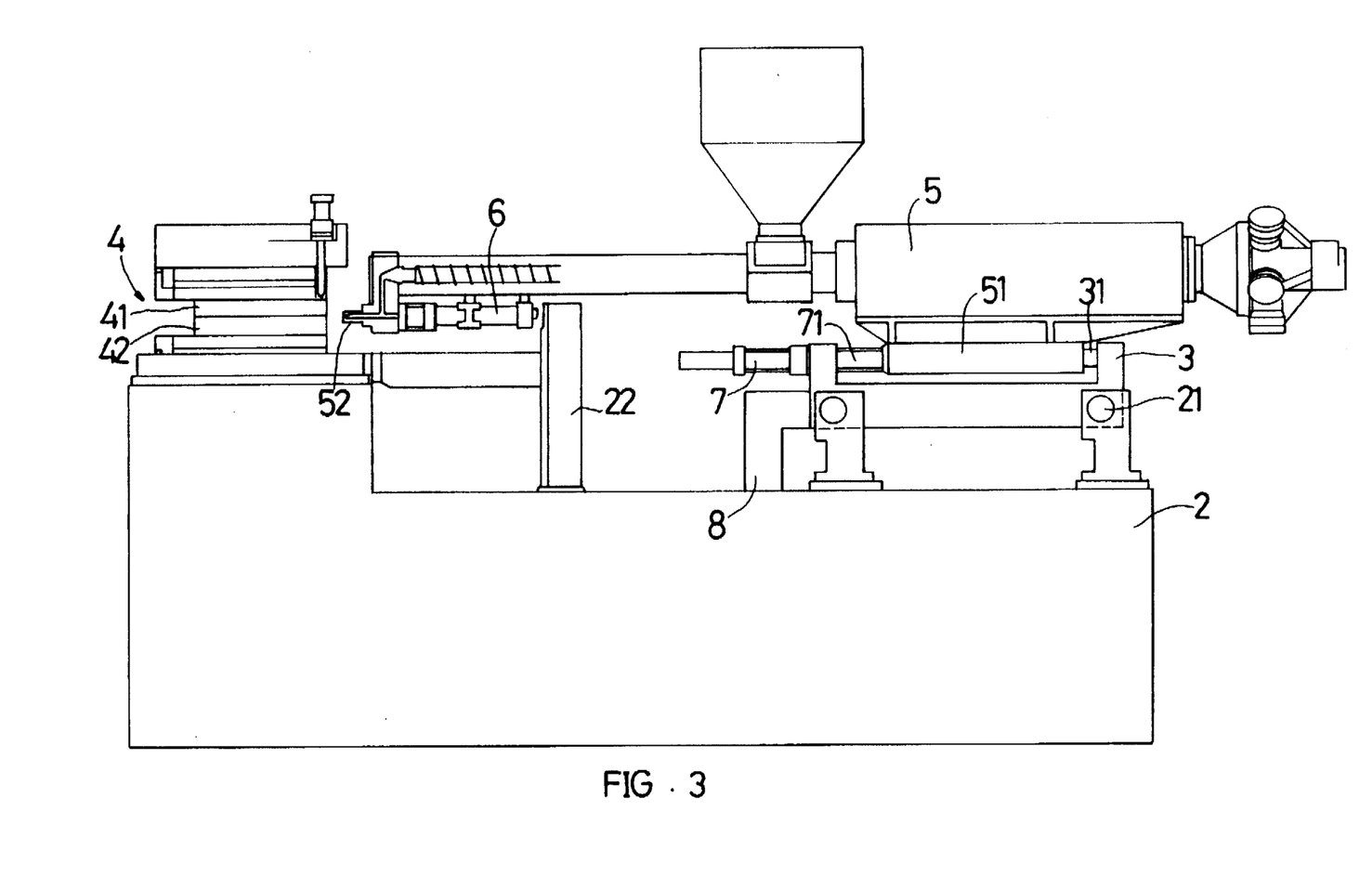
FIG. 3 is a side view of the material injection system of the present invention.

Please refer to FIGS. 2 and 3. The present invention includes a base 2, a shifting seat 3, several molds 4, a material injection seat 5, an advancing hydraulic cylinder 6, a retracting hydraulic cylinder 7 and a guiding device 8.

The base 2 has a shifting seat 3 and a pushing frame 22. The shifting seat 3 is elevated above the top face of the base and transversely movable along Y axis slide rail 21. The pushing frame 22 is disposed between the shifting seat 3 and the molds 4.

Figure 4:
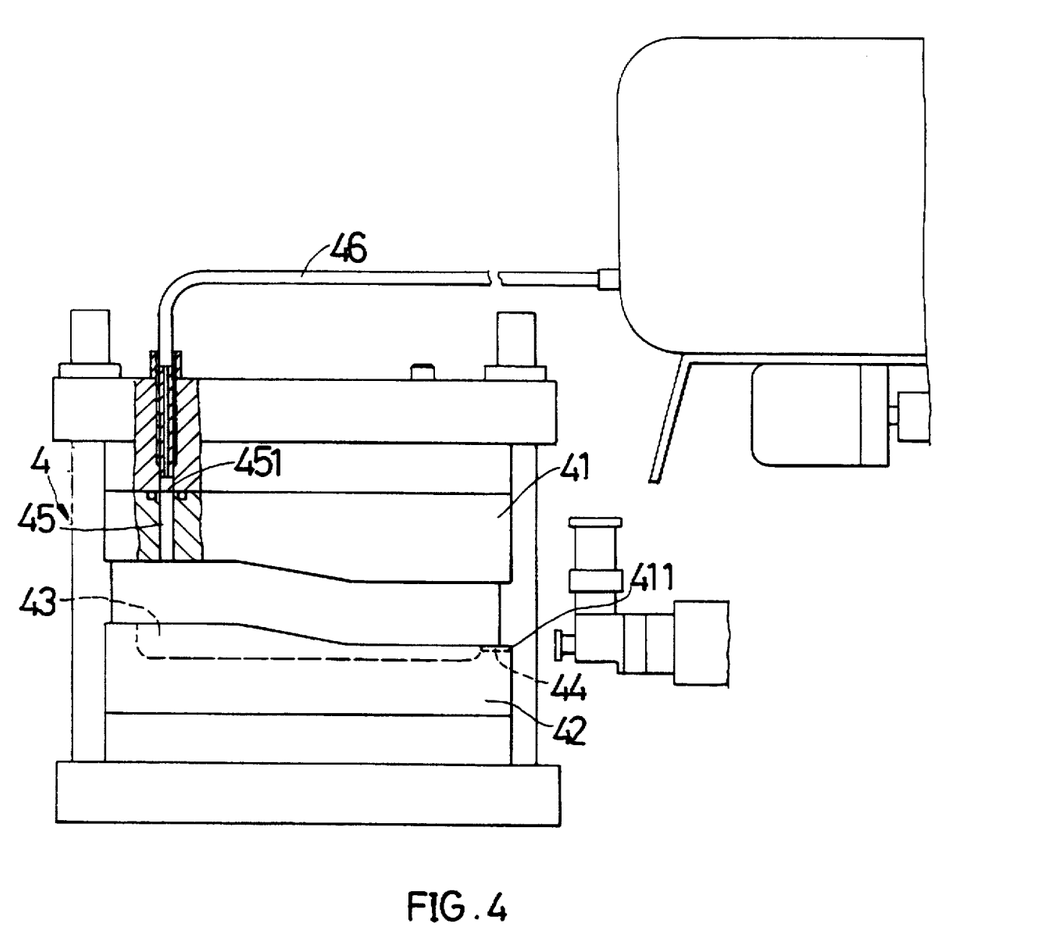
FIG. 4 is a sectional view showing the structure for evacuating the mold cavity of the mold of the present invention.

Referring to FIG. 4, each mold 4 includes a top mold block 41 and a bottom mold block 42 defining therebetween a mold cavity 43, a pouring passage 44 and a ventilating passage 45. One end of each of the pouring passage 44 and the ventilating passage 45 passes through the mold 4 to form a pouring gate 441 and a ventilating opening 451 which is connected to a vacuum sucking pipe 46.

Figure 5:
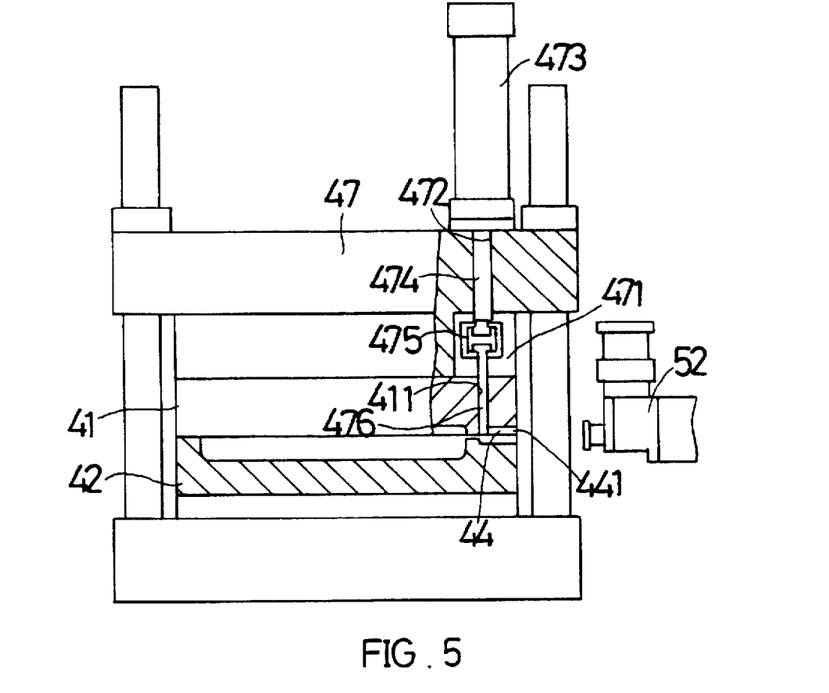
FIG. 5 is a sectional view showing the material stopping structure of the mold of the present invention.

Referring to FIG. 5, the top mold block 41 is disposed with a through hole 411 passing through the pouring gate 44 and the top face. A seat body 47 is disposed on the top mold block 41. The lower section of the lateral side of the seat body 47 is formed with a notch 471 facing the pouring gate 441. The top face of the notch 471 is formed with a shaft hole 472 passing through the top face of the seat body 47. The shaft hole 472 is axially communicated with the through hole 411 of the top mold block 41. A lever section 474 is driven by a driving member 473 disposed on the top face of the seat body 47 to longitudinally move within the shaft hole 472. The bottom end of the lever section 474 is connected with a material stopping pin 476 by a connecting member 475, whereby the material stopping pin 476 is movable in the through hole 411 to open or close the pouring passage 44. In this embodiment, the driving member 473 is a pneumatic cylinder.

The material injection seat 5 is disposed on the shifting seat 3 with a slide seat 51 on its bottom face forward or backward movable along the X axis slide rail 31 on the shifting seat 3. The front end thereof is disposed with a material injection nozzle 52 opposite to the pouring gate 441 of the mold 4.

Figure 6:
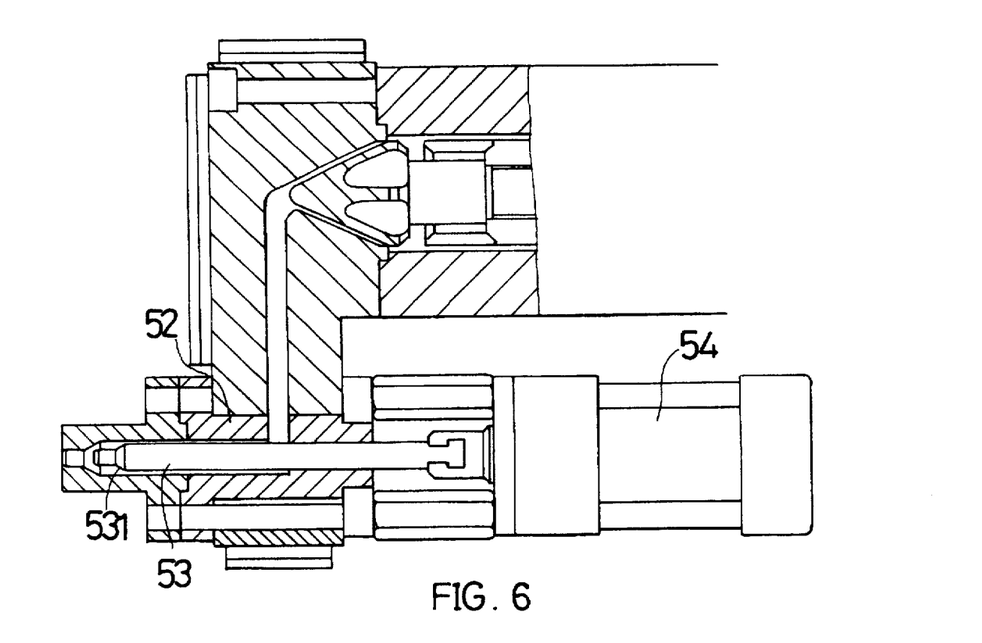
FIG. 6 is a sectional view showing the material stopping structure of the material injection nozzle of the present invention.

Referring to FIG. 6, a material stopping member 53 is coaxially disposed in the material injection nozzle 52. The front end thereof has a slope face 531 for stopping and closing the material injection nozzle 52, while the rear end thereof extends outside the rear side of the nozzle 52 to connect with a driving member 54, whereby the material stopping member 53 can be moved in the nozzle 52.

Figure 7:
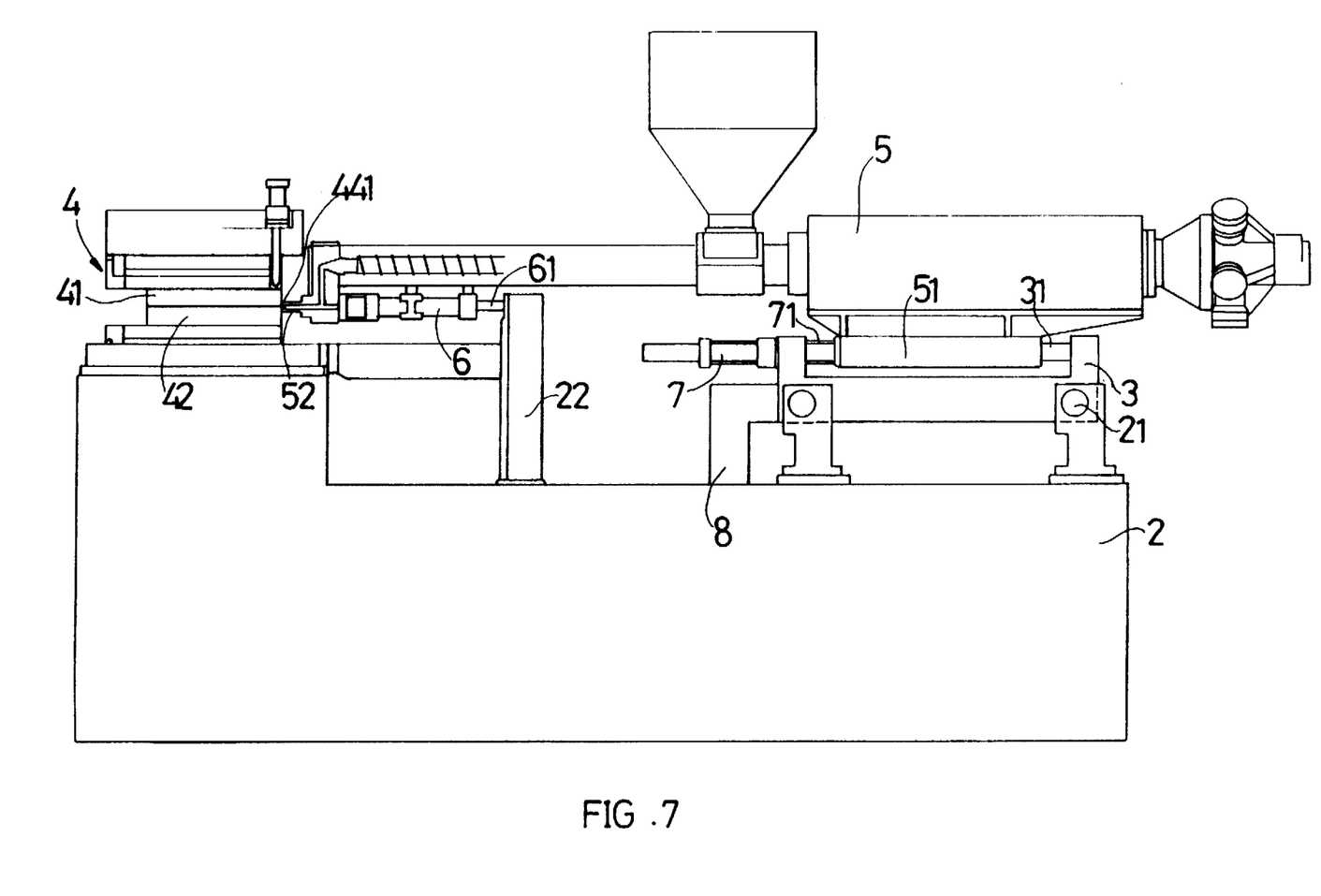
FIG. 7 is a side view showing the advancing operation of the material injection seat of the present invention.

Referring to FIG. 7, the advancing hydraulic cylinder 6 is fixedly secured to the bottom face of the material injection seat 5 near the material injection nozzle 52. The piston stem 61 of the hydraulic cylinder 6 extends outward to push the pushing frame 22 so as to create a reaction force, making the material injection seat 5 advance along the X axis slide rail 31 on the shifting seat 3 so as to make the material injection nozzle 52 contact with the pouring gate 441 of the mold 4.

Figure 8:
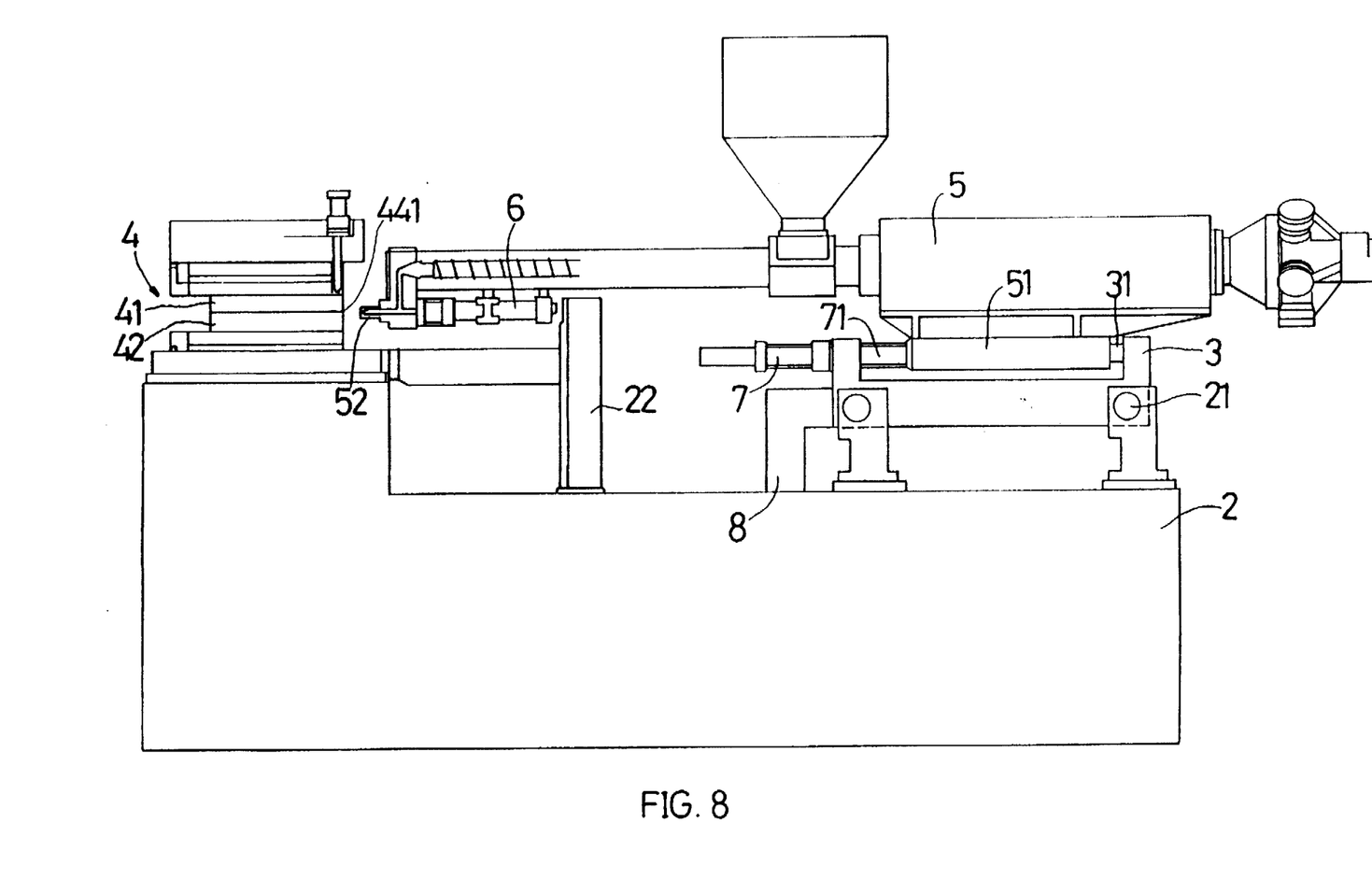
FIG. 8 is a side view showing the retracting operation of the material injection seat of the present invention.

Referring to FIG. 8, the retracting hydraulic cylinder 7 is fixedly secured at the front end of the shifting seat 3 facing the mold 4. The piston stem 71 of the hydraulic cylinder 7 extends outward to push the material injection seat 5, making the material injection seat 5 retract along the X axis slide rail 31 on the shifting seat 3 so as to make the material injection nozzle 52 separate from the pouring gate 441 of the mold 4.

Figure 9:
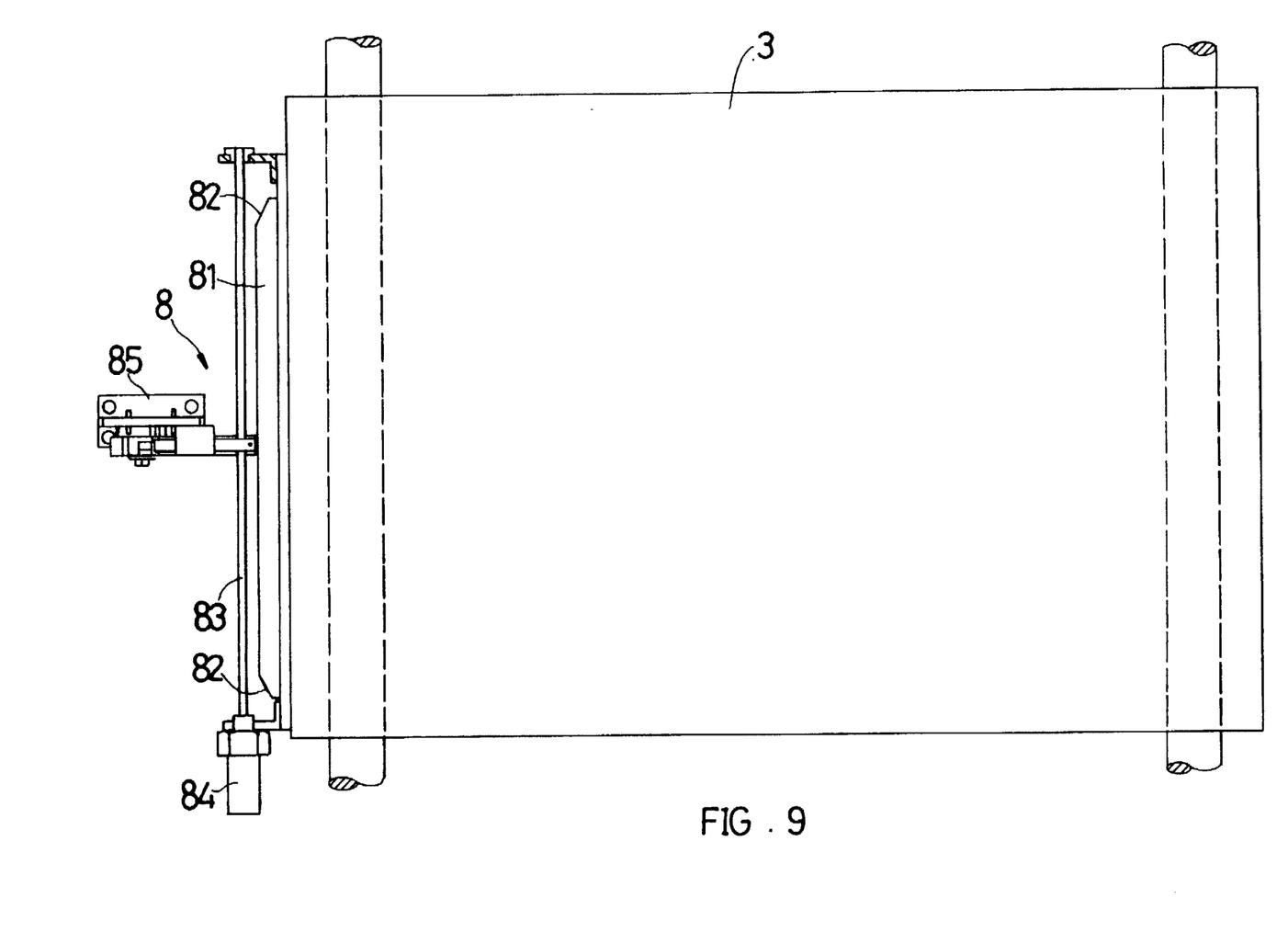
FIG. 9 is a top view showing the locating structure for the shifting seat of the present invention.
Figure 10:
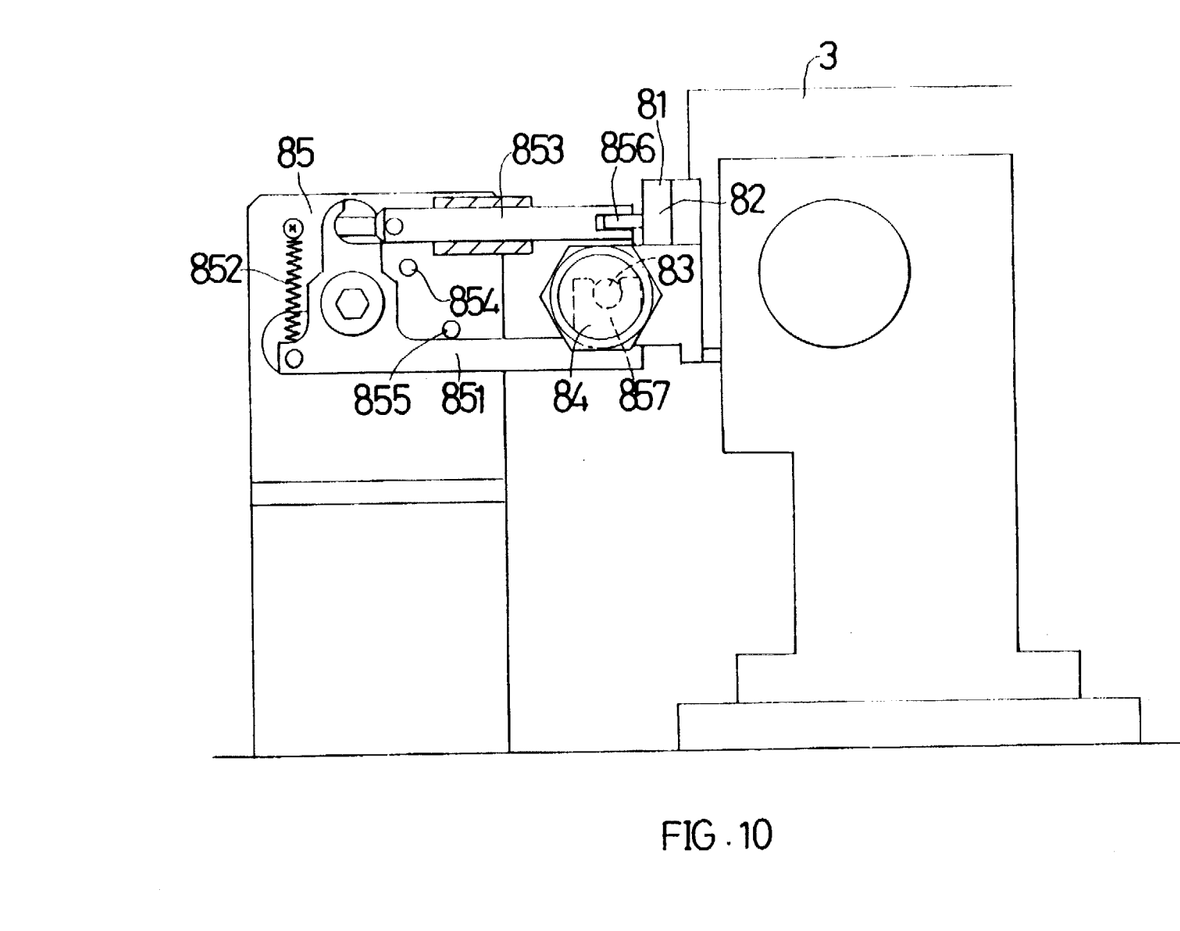
FIG. 10 is a side view showing the locating structure for the shifting seat of the present invention.

Referring to FIGS. 9 and 10, the guiding device 8 is disposed on the shifting seat 3. The guiding device 8 includes an elongated colliding section 81 disposed at the front end face of the shifting seat 3 facing the mold 4. The colliding section 81 is parallel to the Y axis Slide rail 21 of the base 2 and its two ends are respectively formed with two slope faces 82. A parallel sensing shaft 83 is disposed under the front side of the colliding section 81. One end of the sensing shaft 83 is connected to a magnetosensing type linear displacement detector 84. Multiple sensing sets 85 are disposed on the base 2. The number of the sensing sets 85 is equal to that of the molds 4. Each sensing set 85 is pivotally connected with a rocking arm 851 which is pulled by a spring 852 and pushed by a pushing lever 853 and located by two restricting projections. 854, 855, whereby the rocking arm can be up and down swung. A guiding wheel 856 at the front end of the pushing lever 853 contacts with the colliding section 81 to create a displacement by which the rocking arm 851 is swung to latch the sensing shaft 83 via a magnet 857.

According to the above arrangement, the operation procedures of the present invention are as follows:

1. By means of the moving of the colliding section 81 and through the magnetosensing of the magnetosensing type linear displacement detector 84, the accurate position of the shifting seat 3 moving along the Y axis slide rail 21 is identified.

2. When the shifting seat 3 is moved to a certain position, the advancing hydraulic cylinder 6 extends ( in X axis direction ) the piston stem 61 to push the pushing frame 22, making the material injection seat 5 advance along the X axis slide rail 31 on the shifting seat 3 so as to make the material injection nozzle 52 contact with the pouring gate 441 of the mold 4.

3. After the material injection nozzle 52 contacts with the mold 4, the mold 4 activates a sucking machine (not shown) to suck the air out of the mold cavity 43 through the vacuum sucking pipe 46 and the ventilating opening 451.

4. When sucking the air out of the mold cavity 43, simultaneously the driving member 473 above the mold 4 drives the lever section 474 to move upward, making the connecting member 475 drive the material stopping pin 476 to move upward and open the pouring passage 44.

5. Simultaneously, the material stopping member 53 in the material injection nozzle 52 is also driven by the driving member 54, making the slope face 531 at the front end separate from the material injection nozzle 52 and open the nozzle 52 for starting to inject the material.

6. After a predetermined amount of material is injected, the driving member 54 above the mold 4 drives the lever section 474 to move downward, making the connecting member 475 drive the material stopping pin 476 to move downward and close the pouring passage 44 and making the driving member 54 drive the material stopping member 53 to move so that the slope face 531 abuts against the material injection nozzle 52 and closes the nozzle 52 for stopping injecting the material.

7. After stopping injecting the material, the sucking machine stops sucking the air.

8. At the same time, the retracting hydraulic cylinder 7 extends out the piston stem 71 to push the material injection seat 5, making the same retract along the X axis slide rail 31 on the shifting seat 3 so as to make the material injection nozzle 52 separate from the pouring gate 441 of the mold 4.

9. After the material injection seat 5 retracts back to its home position, the guiding device 8 drives the shifting seat 3 to move along the Y axis slide rail 21 to the next mold 4 and the preceding procedure is repeated.

The material injection system of the plastic material injection molding machine has the following advantages:

1. High accuracy. The colliding section of the piston stem of the advancing hydraulic cylinder is not located on the base so that the shocking resulting from the collision is greatly reduced to avoid affection on the cooperation accuracy of the shifting seat and the Y axis slide rail.

2. High quality. During injection of the material, the air in the mold cavity is sucked out into a low pressure state so as to create a sucking force for sucking the material. Therefore, the material is fed in more quickly. Moreover, in the state without the air, the surface and interior of the molded product are free from any bubble so that the quality is ensured. In addition, the material stopping pin is disposed at the pouring passage of the mold for closing the pouring passage after the material injection is completed, so that the pressure in the mold cavity is kept constant and the capacity of the mold cavity is also kept constant. This makes it easier to stabilize and control the quality and weight of the product.

3. The material will not spill out. The material stopping member is coaxially disposed in the material injection nozzle and is driven by the driving member to shut off the material injection nozzle and prevent the material from leaking out. It completely solves the leakage problem of a traditional material injection system.

4. Better location accuracy. The respective magnetosensing type linear displacement detectors are arranged on the base at predetermined intervals. Therefore, these detectors can extend to the necessary distance according to the requirement of the operation, whereby these detectors are not limited by the maximum reading value so as to detect the position of the elongated colliding section. Therefore, the guiding device of the present invention is practically applicable to any range of distance. Moreover, the detector employs the magnet to detect the distance of the adjacent colliding section of the shifting seat. Therefore, each magnetosensing type linear displacement detector can serve as a standard point and even the power is suddenly cut during the operation, after the power is restored, the detector can immediately detect the distance from the corresponding colliding section. In addition, each detector is located at a predetermined position so that it is unnecessary to perform zeroing procedure after the power is restored. This facilitates the operation.

It is to be understood that the above description and drawings are only used for illustrating one embodiment of the present invention, not intended to limit the scope thereof. Any variation and derivation from the above description and drawings should be included in the scope of the present invention.

What is claimed is:

1. A material injection system for an injection molding machine comprising:

(a) a base having distal first and second end portions and an intermediate portion extending therebetween along an axial direction, said base having formed on said intermediate section a pushing frame projecting therefrom, said base having formed at said first end portion a shifting seat, said shifting seat being displaceable with respect to said base in a direction substantially normal to said axial direction;

(b) at least one mold coupled to said second end portion of said base, said mold having an outer surface, said mold including a top mold block and a bottom mold block defining therebetween a mold cavity, said mold having formed therein a pouring passage and a ventilating passage extending from said mold cavity, said pouring and ventilating passages respectively defining at said mold outer surface a pouring gate and a ventilating opening, said top mold block having formed therein a through hole intersecting said pouring passage;

(c) means for substantially evacuating said mold cavity, said means including a sucking pipe connected to said ventilating opening of said mold;

(d) a material injection seat displaceably coupled to said shifting seat of said base for forward or backward displacement with respect thereto along said axial direction, said material injection seat having a front end portion extending substantially to said second end portion of said base;

(e) a seat body disposed on said top mold block, said seat body having a notched portion, said notched portion having formed therethrough a shaft hole substantially aligned axially with said top mold block through hole, said seat body including a lever section received in said shaft hole to be axially displaceable therein and a material stopping pin substantially coaxially coupled to said lever section to extend into said top mold block through hole, said material stopping pin being adapted to reversibly block said pouring passage responsive to displacement of said lever section;

(f) driving means coupled to said seat body for displacing, said lever section;

(g) a material injection assembly coupled to said front end of said material injection seat, said material injection assembly including a material injection nozzle disposed adjacent said pouring gate of said mold and a material stopping member coaxially disposed within said material injection nozzle, said material stopping member having a sloped front face adapted to engage said material injection nozzle in a sealed manner, said material injection assembly including means for reversibly displacing said material stopping member into and out of said sealed engagement with said material injection nozzle;

(h) advancing cylinder means coupled to said front end of said material injection seat for actuating said forward displacement of said material injection seat, said advancing cylinder means including a piston stem adapted to apply a thrust force against said pushing frame of said bases whereby said material injection nozzle is displaced into engagement with said mold pouring gate; and, (i) retracting cylinder means coupled to said shifting seat for actuating said backward displacement of said material injection seat, said retracting cylinder means including a piston stem adapted to apply a thrust force against said material injection seat, whereby said material injection nozzle is displaced to disengage from said mold pouring gate.

2. The material injection system as recited in claim 1 further comprising guiding means coupled to said shifting seat, said guiding means including:

(a) an elongate colliding section disposed on said shifting seat, said colliding section having distal tapered end portions connected by a middle portion extending in a direction transverse to said axial direction;

(b) a sensing shaft coupled to said shifting seat, said sensing shaft being disposed in substantially parallel spaced relation to said colliding section;

(c) at least one sensing set coupled to said base, said sensing set being actuable responsive to the position of said colliding section relative thereto between contact and non-contact positions, said sensing set engaging said sensing shaft in said contact position and being disengaged from said sensing shaft in said non-contact position; and, (d) contact sensing means coupled to said sensing shaft for indicating when said sensing set is in said contact position.

3. The material injection system as recited in claim 2 wherein said sensing set includes:

(a) a pivotally displaceable rocking arm;

(b) a spring coupled to said racking arm, said spring biasing said racking arm towards a first pivotal displacement direction; and, (c) a pushing lever coupled to said rocking arm for actuating the pivotal displacement of said rocking arm in opposition to said biasing thereof, said pushing lever terminating in a guiding wheel, said guiding wheel engaging said colliding section;

whereby said rocking arm remains engaged with said sensing shaft when said pushing lever guiding wheel is engaged with said middle portion of said colliding section and remains disengaged from said sensing shaft when said pushing lever guiding wheel is engaged with one of said pushing lever tapered end portions.

4. The material injection system as recited in claim 3 comprising in equal numbers a plurality of said sensing sets and said molds, each sensing get uniquely corresponding to a predetermined one of said molds.

* * * * *